United States Patent
Yokochi (10) Patent No.: US 10,468,924 B2
(45) Date of Patent: Nov. 5, 2019

(54) ROTOR FOR SYNCHRONOUS ELECTRIC MOTOR

(71) Applicant: OKUMA Corporation, Niwa-gun, Aichi (JP)

(72) Inventor: Takanori Yokochi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 246 days.

(21) Appl. No.: 15/586,855

(22) Filed: May 4, 2017

(65) Prior Publication Data

US 2017/0338702 A1   Nov. 23, 2017

(30) Foreign Application Priority Data

May 17, 2016 (JP) .................... 2016-099022

(51) Int. Cl.
*H02K 1/24* (2006.01)
*H02K 1/27* (2006.01)

(52) U.S. Cl.
CPC ............ *H02K 1/246* (2013.01); *H02K 1/276* (2013.01)

(58) Field of Classification Search
CPC ....... H02K 1/246; H02K 1/2706; H02K 1/276
USPC .................................... 310/156.53
See application file for complete search history.

(56) References Cited

U.S. PATENT DOCUMENTS

| | | | | |
|---|---|---|---|---|
| 6,121,706 A * | 9/2000 | Nashiki | ................. | H02K 1/246 310/152 |
| 6,211,593 B1 * | 4/2001 | Nashiki | ................. | H02K 1/278 310/114 |
| 6,815,859 B2 * | 11/2004 | Sakuma | ................. | H02K 21/14 310/156.53 |
| 6,836,045 B2 * | 12/2004 | Murakami | ............ | H02K 1/246 310/156.53 |
| 7,233,089 B2 * | 6/2007 | Matsunobu | ............ | H02K 1/276 310/156.45 |
| 7,911,107 B2 * | 3/2011 | Nashiki | ................... | H02K 1/06 310/156.55 |
| 2001/0017492 A1 * | 8/2001 | Tajima | ................... | H02K 1/276 310/156.57 |
| 2004/0150282 A1 * | 8/2004 | Murakami | ............ | H02K 1/246 310/156.53 |
| 2005/0062355 A1 * | 3/2005 | Matsunobu | ............ | H02K 1/276 310/156.53 |
| 2007/0152527 A1 * | 7/2007 | Yura | ...................... | H02K 1/246 310/156.53 |

(Continued)

*Primary Examiner* — Alex W Mok
(74) *Attorney, Agent, or Firm* — Cantor Colburn LLP (57) ABSTRACT

A rotor for a flux-barrier-type reluctance motor having a plurality of poles formed in a circumferential direction includes a plurality of slits provided for each pole, a permanent magnet partially inserted into the slits in such a manner that magnetic poles of the permanent magnet are directed substantially orthogonal to the slit, a slit for a movable element disposed radially inside the permanent magnet disposed at an innermost position in a radial direction, and a movable element made of a magnetic material and inserted into the cavity, the movable element being capable of moving in the slit for the movable element in the circumferential direction. A radially inner side of the innermost slit into which the permanent magnet is inserted and radially outer and inner sides of both the slit for the movable element and the movable element are in a concentric circular-arc shape.

8 Claims, 8 Drawing Sheets

(56) References Cited

U.S. PATENT DOCUMENTS

| | | | | |
|---|---|---|---|---|
| 2010/0213885 A1* | 8/2010 | Ichiyama | ............... | H02K 1/276 318/720 |
| 2011/0309706 A1* | 12/2011 | Takahashi | .............. | H02K 1/276 310/156.53 |
| 2015/0303749 A1* | 10/2015 | Okubo | ................... | H02K 29/03 310/156.38 |

* cited by examiner

ROTOR FOR SYNCHRONOUS ELECTRIC MOTOR

CROSS REFERENCE TO RELATED APPLICATION

The present application claims priority under 35 U.S.C. § 119 to the entire disclosure of Japanese Patent Application No. 2016-099022 filed on May 17, 2016, including the specification, claims, drawings, and abstract, is incorporated herein by reference in its entirety.

TECHNICAL FIELD

The description discloses a rotor for a multilayered flux-barrier-type reluctance motor with a permanent magnet inserted in the rotor.

BACKGROUND

Various kinds of structures have been proposed for rotors for electric motors. In one example, a rotor for a multilayered flux-barrier-type reluctance motor includes a plurality of slits arranged inside a core to form a plurality of magnetic paths. Permanent magnets are inserted in the slits. A structure of such a motor of the multilayered flux-barrier-type reluctance motor is described below.

Figure 6:
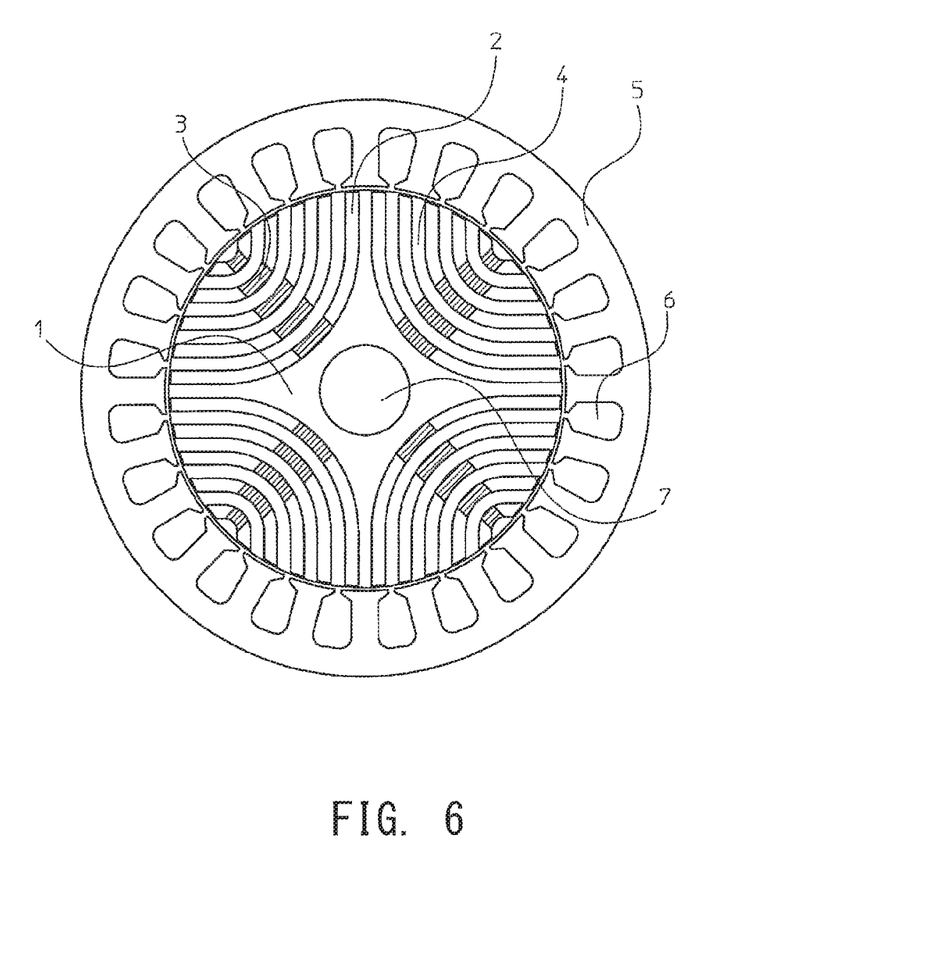
FIG. 6 illustrates an example of a conventional electric motor.

FIG. 6 is an example cross-section of a rotor structure in a conventional multilayered flux-barrier-type reluctance motor. A rotor 1 of FIG. 6 is made of silicon steel plates stacked on top of each other. Each silicon steel plate includes a plurality of slits 2 arranged therein and magnetic paths 4 are formed among the slits 2. Specifically, the rotor 1 includes a plurality of poles (e.g., four poles are illustrated in the drawing) formed in a circumferential direction. Each pole has a plurality of (e.g., five in the drawing) slits 2. The slits 2 for each pole are arranged in parallel with each other in a radial direction. Each slit 2 has a substantially circular-arc shape or U-shape that opens outward. A permanent magnet 3 is partially inserted into the slits 2. Specifically, the permanent magnet 3 is inserted into a portion of the slits 2 away from the outer periphery of the slits 2 and closer to the inner periphery of the slits 2. Magnetic poles of the permanent magnet 3 are directed perpendicular to the magnetic paths to allow cancellation of magnetic flux leakage.

A stator 5 is disposed outside the rotor 1. As is well known in the art, the stator 5 includes slots 6 each having a winding in which electric current flows to generate torque in the electric motor. The rotor 1 includes an output shaft 7 which is disposed in the center part of the rotor 1 to externally transmit torque generated in the electric motor.

Figure 7:
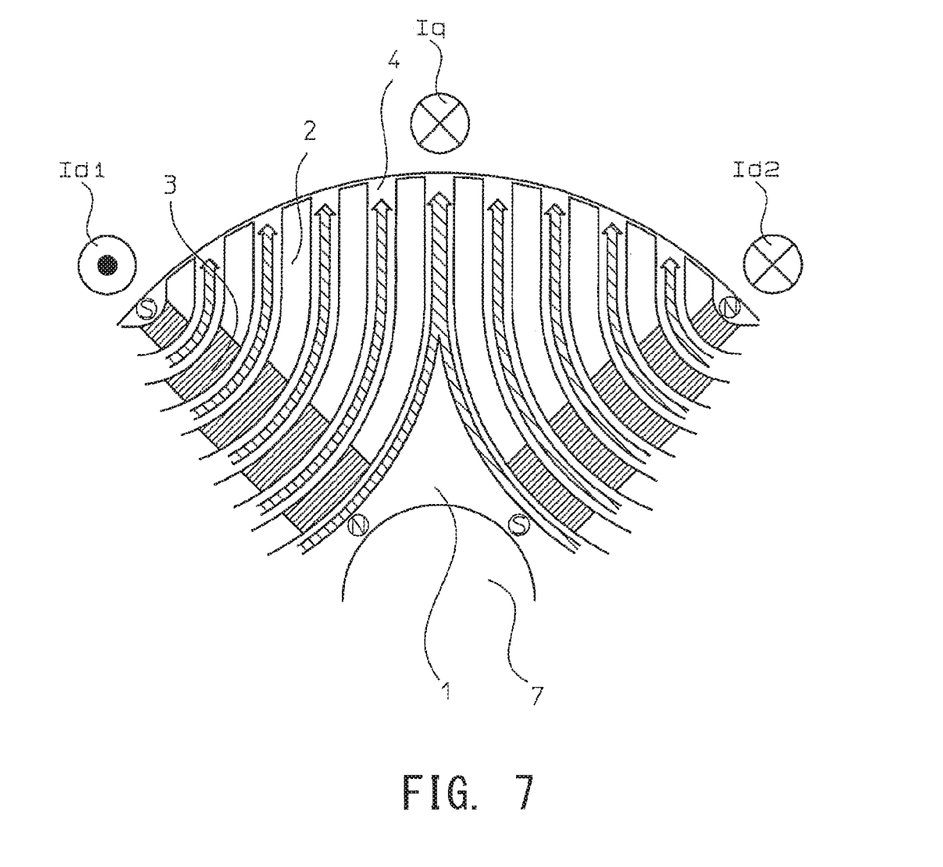
FIG. 7 illustrates a flowing current and a flow of magnetic flux in a conventional rotor.

In the rotor 1 including the permanent magnets 3 inserted in the slits 2, magnetic flux flows as illustrated in FIG. 7 which is a partial enlarged view of the rotor 1 of FIG. 6. In FIG. 7, a torque current for generating torque is supplied to the winding located at position Iq in the stator. The torque current constantly flows in the same direction in the motor. In FIG. 7, the torque current flows in the winding at Iq from the front side toward the back side of the drawing. Further, a field current flows in the windings at positions Id1 and Id2 to form magnet flux along the magnetic paths 4. In FIG. 7, the current is made to flow from the back side toward the front side of the drawing in the winding at Id1 and vice versa in the winding at Id2 to generate anticlockwise rotary torque to the rotor 1. Accordingly, the magnetic flux is formed around the windings at Id1 and Id2 in a direction indicated by arrows shaded by hatched lines in the drawing around the positions of the windings in accordance with the right-hand screw rule. At the winding at Iq, a clockwise force is generated in accordance with Fleming's left-hand rule. Thus, the rotary torque is generated in an anticlockwise direction in the rotor 1 in accordance with the law of action and reaction.

Next, the direction of magnetic poles of the permanent magnet 3 inserted into the slits 2 is described. The torque current constantly flows in the same direction at the position Iq, as mentioned above. That is, the torque current flows from the front side toward the back side of the drawing. The magnetic flux is also formed around the winding at Iq in accordance with the right-hand screw rule. The direction of the magnetic flux is perpendicular to the slits 2, generating a large magnetic resistance and therefore, impeding generation of the magnetic flux. In practice, magnetic flux even smaller than the field magnetic flux is formed in this direction. Such a magnetic flux is called magnetic flux leakage. In FIG. 7, the magnetic flux leakage interlinks with the winding from the inside to the outside at Id1 and vice versa at Id2, generating rotary torque in the clockwise direction in the rotor 1 in accordance with Fleming's left-hand rule. This direction, however, cancels the torque generated by the torque current, decreasing torque generation of the rotor. This is called armature reaction. To decrease the armature reaction, permanent magnets 3 are inserted in a direction to cancel the magnetic flux leakage, as illustrated in FIG. 7. Specifically, the permanent magnet 3 inserted into the left-hand slits has the south pole on the internal end and the north pole on the external end relative to the radial direction of the rotor 1, while the permanent magnet 3 inserted into the right-hand slits has the north pole on the external end and the south pole on the internal end.

The permanent magnets 3 thus inserted in the above-described directions need to have magnetomotive force large enough to cancel the magnetic flux leakage. Specifically, the magnitude of the torque current increases/decreases depending on the instruction of torque to be generated by the electric motor. The magnetomotive force of the permanent magnets 3 is determined to be equivalent to the magnetic flux leakage which would be generated when the torque current having an assumedly maximum value is supplied. If the permanent magnets 3 having a larger magnetomotive force are inserted, the armature reaction would rather increase depending on the direction of rotation.

Figure 8:
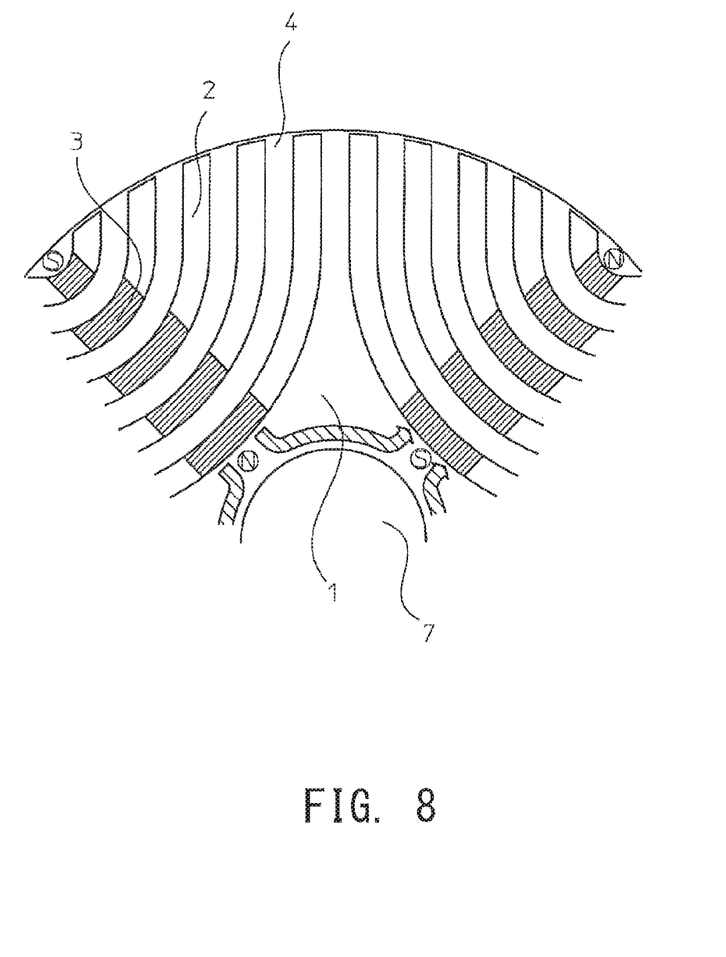
FIG. 8 illustrates a flow of magnetic flux caused by permanent magnets in the conventional rotor.

Further, the magnetic flux output from each permanent magnet 3 enters neighboring magnets 3 inside the rotor 1 in the radial direction, as illustrated in FIG. 8, so that the magnetic flux of the permanent magnet 3 does not reach the surface of the rotor 1 to increase the field magnetic flux. This is equivalent to an ordinary synchronous reluctance motor, which is realized by removing the permanent magnets 3 from FIG. 6, in that the strength of the magnetic poles formed in the rotor 1 is determined in accordance with the intensity of the field current and that the magnitude of torque generated in the electric motor depends on the strength of the magnetic poles and the magnitude of the torque current. A power factor increases because the magnetic flux leakage is smaller than that of the ordinary reluctance motor.

However, the fact that the magnetic power of the permanent magnets is not used for the torque of the electric motor, although the permanent magnets are inserted into the rotor, is very inefficient from a viewpoint of energy efficiency. The description therefore discloses a rotor capable of increasing torque generated by an electric motor using magnetic force of permanent magnets inserted into the rotor.

SUMMARY

A rotor for a flux-barrier-type reluctance motor having a plurality of poles formed in a circumferential direction includes a plurality of slits provided for each pole and arranged in parallel with each other in a radial direction to form a magnetic path between the slits, a permanent magnet partially inserted into the slits in such a manner that magnetic poles of the permanent magnet are directed substantially orthogonal to the slits, a cavity having a width in a circumferential direction and disposed radially inside the permanent magnet which is disposed at an innermost position in the radial direction, and a movable element made of a magnetic material and inserted into the cavity, the movable element being capable of moving in the cavity in the circumferential direction while being in contact with both sides of the cavity in the radial direction, in which a radially inner side of the innermost slit, into which the permanent magnet is inserted, and radially outer and inner sides of both the cavity and the movable element are in a concentric circular-arc shape or in a linear shape and parallel with each other The rotor disclosed herein increases the torque to be generated by increasing the field magnetic flux. This leads to minimize the field current necessary for generating an equivalent amount of torque, and also leads to increase a power factor of the electric motor. In addition, a torque constant of the electric motor representing a ratio of generated torque relative to the supplied current increases.

BRIEF DESCRIPTION OF DRAWINGS

Embodiments of the description will be described by reference to the following figures, wherein.

DESCRIPTION OF EMBODIMENTS

Figure 1:
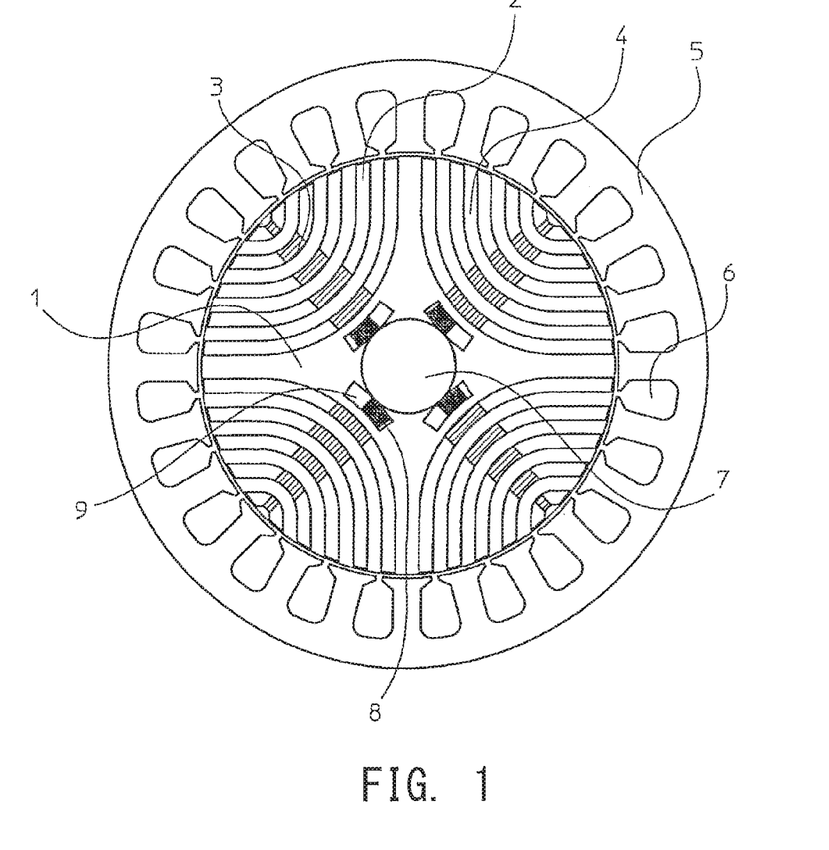
FIG. 1 illustrates an example electric motor.

FIG. 1 illustrates an example electric motor. Constituent elements of a rotor 1 of FIG. 1 that are identical to those of FIG. 6, which illustrates a background technology, are indicated by the same reference signs and the descriptions thereof will not be repeated. In the following description, the terms "circumferential direction" and "radial direction" refer to a circumferential direction and a radial direction, respectively, of a rotor. The term "inner side" refers to a side, among sides constituting an outer shape of a slit or a movable element, arranged radially inside of such a slit or movable element. The term "outer side" refers to a side, among sides constituting an outer shape of a slit or a movable element, arranged radially outside of such a slit or movable element.

Figure 2:
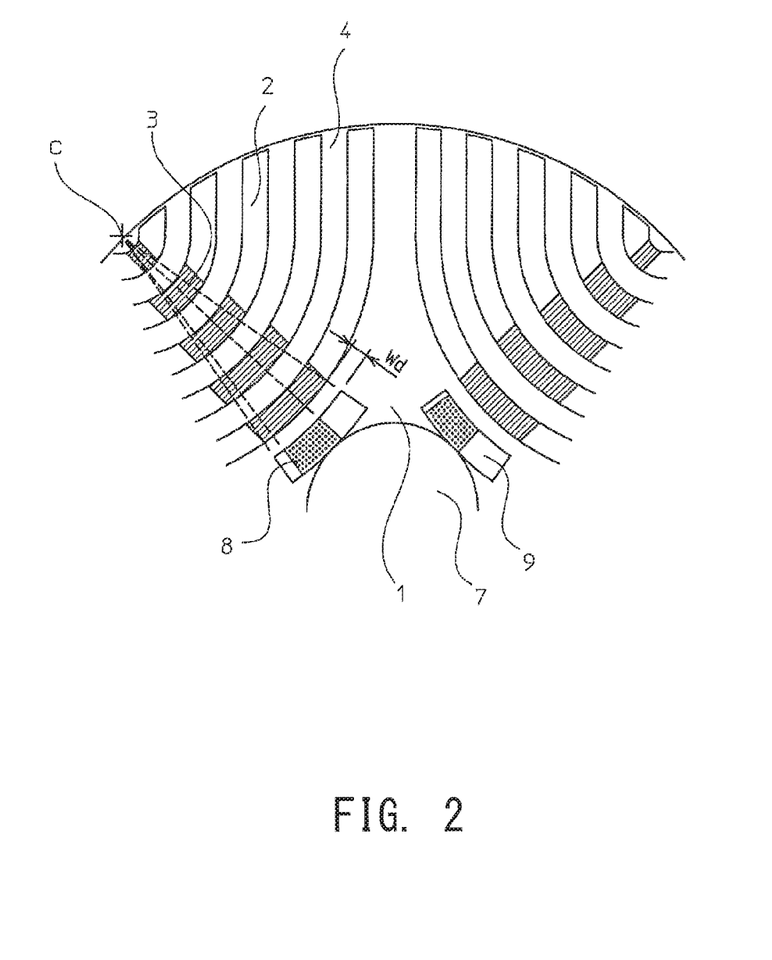
FIG. 2 illustrates an example of positions of a movable element and slits for the movable element of a rotor.

FIG. 2 is a partial enlarged view of the rotor 1 of FIG. 1. FIG. 2 illustrates a plurality of slits 2 arranged in a radial direction into which permanent magnets 3 are individually inserted partially. Each of the permanent magnets 3 is also inserted partially into a slit 2 located at a radially innermost position (hereinafter referred to as an "innermost slit 2"). Located further inside radially from the permanent magnet 3 which is inserted into the innermost slit 2, a cavity is formed at a position apart from the innermost slit 2 by a predetermined distance. The cavity will be referred to as a "slit 9 for a movable element" hereinafter. The slit 9 for the movable element has a width in the circumferential direction. Both inner and outer sides of the slit 9 for the movable element should be in a circular-arc shape or a linear shape. In FIG. 2, the inner side of the innermost slit 2 into which the permanent magnet is inserted is in a circular-arc shape, so that both the inner side and the outer side of the slit 9 for the movable element are also in the circular-arc shape. Being in the circular-arc shape, the inner side of the innermost slit 2 and the inner and outer sides of the slit 9 for the movable element form a concentric circular-arc shape about the same point. In addition, lines connecting the inner side and the outer side of the slit 9 for the movable element pass the center point of the circular arc indicated by C in the drawing. The slit 9 for the movable element has a width in the radial direction that should be equal to or larger than the width of the permanent magnet 3 in the radial direction.

A movable element 8 is disposed in the slit 9 for the movable element. Inner and outer sides of the movable element 8 are also in the circular-arc shape which is concentric to the circular-arc shape formed by the inner and outer sides of the slit 9 for the movable element or the like. Lines connecting the inner side and the outer side of the movable element 8 also extend to pass the center C. In other words, the ends of the movable element 8 in the circumferential direction are in a shape substantially identical to the shape of the ends of the slit 9 for the movable element in the circumferential direction. The movable element 8 has a width in the radial direction slightly narrower than the width of the slit 9 for the movable element in the radial direction, so that the movable element 8 can move in the slit 9 for the movable element while being substantially in contact with both side faces of the slit 9 for the movable element in the radial direction. When the movable element 8 impinges on an end face of the slit 9 for the movable element in the circumferential direction, the end face of the movable element 8 in the circumferential direction can fit closely with the end face of the slit 9 for the movable element.

The movable element 8 has a width in the circumferential direction that should be smaller than the width of the slit 9 in the circumferential direction. In the drawing, the width of the movable element 8 is illustrated as precisely half the width of the slit 9 in the circumferential direction. The movable element 8 can move smoothly in the slit 9 for the movable element because less frictional contact surfaces (i.e., side faces in the radial direction) are provided on the slit 9 for the movable element and the movable element 8. The movable element 8 is made of a magnetic substance. Specifically, an iron block or a stacked structure of silicon steel plates, as used in the rotor, or the like may be used so long as the magnetic substance is used. A length in a stacking direction, however, needs to be equal to or slightly shorter than the length of the stack of the rotor 1.

A width Wd is described. The width Wd, as illustrated in the drawing, represents a distance between the inner side of the innermost slit 2 and the outer side of the slit 9 in the radial direction. In the structure of the rotor 1 described above, the field current is supplied to the rotor 1 for the excitation of the field magnetic flux in the rotor 1. The excitation generates the field magnetic flux, so that the intensity of the field magnetic flux depends on the magnitude of the field current. In generating a desired torque in the electric motor, the torque current and the field current are controlled under a condition that achieves a high torque constant of the electric motor, so that both currents can be determined uniquely when a necessary torque is determined. Namely, the maximum value of the field current can be determined when the maximum torque of the electric motor is determined. When the maximum value of the field current is determined, the maximum intensity of the magnetic field of the field magnetic flux is determined, from which Wd is determined. As well known in the art, with a permeability $\mu$ of the material of the silicon steel plates that constitute the rotor 1, the magnetic flux having a magnetic flux intensity H as indicated in the rotor 1 in the drawing passes through the rotor 1 to give a magnetic flux density B:

$$B=\mu \times H$$

As the permeability $\mu$ and the intensity H of the magnetic flux that passes through the portion indicated by Wd are known, a magnetic flux density can be calculated. The magnetic flux density of the silicon steel plates usually increases as the intensity of the magnetic field increases, but when reaching and exceeding a certain point, the magnetic flux density barely increases, which is a state called saturation of the magnetic flux. A saturating point of the magnetic flux density is different depending on the kinds of material of the silicon steel plate. Referring to FIG. 2, the saturating point of the magnetic flux density can be calculated in accordance with the material, if known, of the silicon steel plates that constitute the rotor 1. Meanwhile, the amount of the magnetic flux that passes through the portion indicated by Wd is determined on the basis of the maximum value of intensity of the magnetic field of the field magnetic flux. The obtained amount of the magnetic flux is then divided by a cross-sectional area (i.e., the width Wd in the radial direction multiplied by an axial length of the rotor) to give a magnetic flux density. Wd is determined so that the obtained magnetic flux density is equal to the saturating magnetic flux density. The interval Wd between the innermost slit 2 and the slit 9 for the movable element is thus determined.

Figure 3:
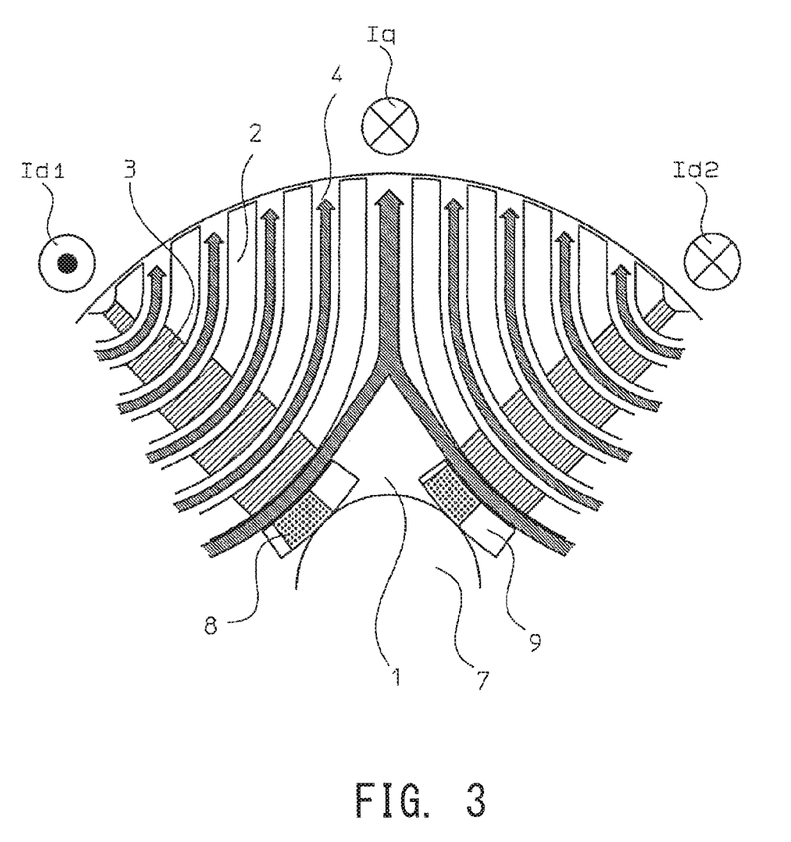
FIG. 3 illustrates an example of a flowing current and a flow of magnetic flux in the rotor.

The rotor 1 is thus structured. Referring to FIG. 3, the rotor 1 is described with respect to the flow of the field magnetic flux and the movement of the movable element 8 when the torque is generated, and the flow of magnetic flux caused by the permanent magnet 3 after the movement of the movable element 8. FIG. 3 illustrates the flow of the field magnetic flux when the torque is generated in the counterclockwise direction in the rotor 1 of FIG. 2. As described above, the field current flows in the winding at Id1 from the back side toward the front side of the drawing and vice versa in the winding at Id2, thus causing excitation of the field magnetic flux as indicated by hatched arrows in the drawing. In this state, the torque current flows in the winding at Iq from the front side toward the back side of the drawing, so that the winding receives a clockwise force in accordance with Fleming's left hand rule, while the torque is generated in the rotor 1 in the counterclockwise direction in accordance with the law of action and reaction. In this case, the magnetic flux is in the saturation state due to the field magnetic flux between the innermost slit 2 and the slit 9 for the movable element. The magnetic flux generated by the permanent magnet 3, therefore, cannot pass through the magnetic paths 4 in which the field magnetic flux passes.

Figure 4:
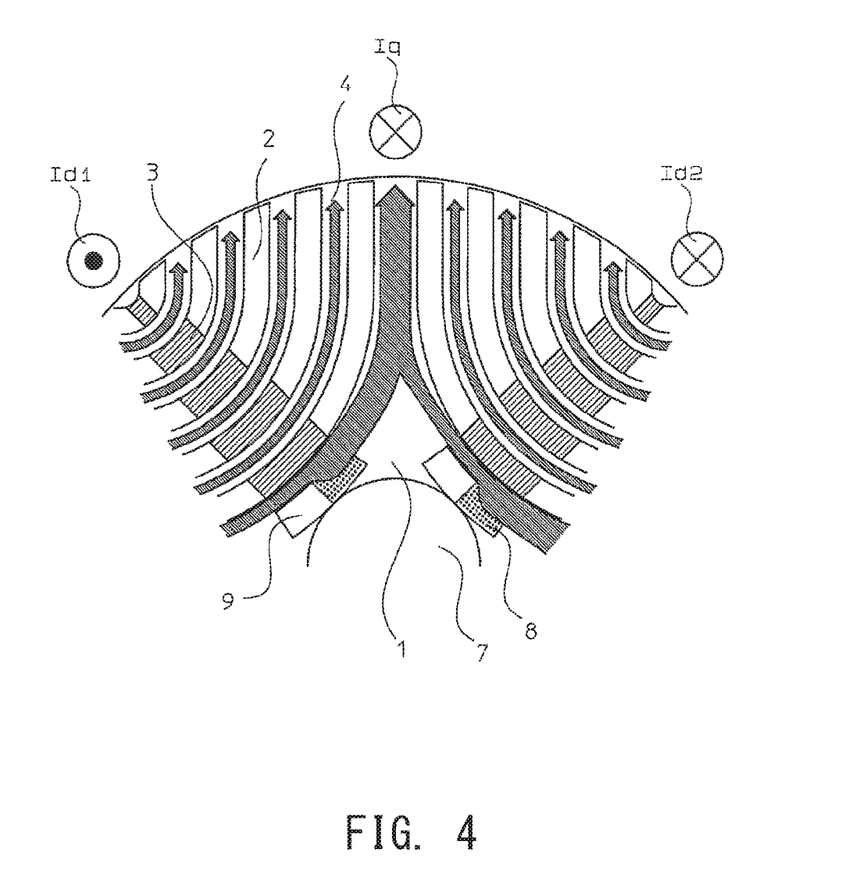
FIG. 4 illustrates an example of a flowing current and a flow of magnetic flux in the rotor.

When the torque is generated in the rotor 1, the movable element 8 receives inertial force in a direction opposite to the direction of the torque. The movable element 8 is freely movable in the slit 9 for the movable element as mentioned above, and moves toward the direction of receiving the inertial force until the movable element 8 impinges on the side face of the slit 9 for the movable element. FIG. 4 illustrates the rotor 1 after the movable element 8 has moved. In this case, the movable element 8, which is a magnetic body, has moved clockwise to closely fit the side face of the slit 9 for the movable element in the radial direction, thereby increasing the width of a corresponding part of the magnetic path 4. The magnetic flux from the north pole of the left permanent magnet 3 in FIG. 4 passes through the magnetic paths 4. In the conventional technique as illustrated, for example, in FIG. 8, the magnetic flux has flowed toward the south pole of the right-hand permanent magnet 3. In contrast, in FIG. 4, the magnetic flux does not enter the right-hand permanent magnet 3, but merges with the field magnetic flux and reaches the outer periphery of the rotor, because the magnetic path 4 leading to the right-hand permanent magnet 3 is formed as a slit. As a result of this, the field magnetic flux in the magnetic path 4; that is, the center of the magnetic pole facing Iq, increases. In accordance with the increase of the field magnetic flux at the center of the magnetic pole, the magnetic flux density of the winding at Iq in which the torque current flows also increases. The generated force in the winding increases in accordance with Fleming's left-hand rule, which leads to an increase of torque generated in the rotor 1. The width of the magnetic path 4 in the center of the magnetic pole should be wider than that of the conventional technique, in order to prevent saturation of the magnetic flux. A rate of increase of the width is calculated on the basis of the amount of the magnetic flux from the permanent magnet 3.

The principle of increasing torque generation of the rotor disclosed herein has been described. In a case where the torque is generated in the clockwise direction opposite the direction of the embodiment described above, the movable element 8 moves counterclockwise by the inertial force, and the magnetic flux from the permanent magnet 3 is directed opposite to the direction of FIG. 4. In this case, the field current is made to flow in the direction opposite to the direction of FIG. 4, causing the field magnetic flux to flow oppositely. As a result, the torque generated in the clockwise direction increases.

As described above, increasing the torque generation by increasing the field magnetic flux can minimize the field current required to generate an equivalent amount of torque. Minimizing the field current not only increases the power factor of the electric motor, but also decreases a total current combining the field current and the torque current. Thus, the current required to generate the equivalent amount of torque decreases, or the torque constant increases.

In the rotor as disclosed herein, the movable element 8 illustrated in FIG. 3 has the width equivalent to half the width of the slit 9 for the movable element in the circumferential direction. If the movable element 8 has a width larger than half the width of the slit 9 for the movable element, the magnetic flux from the permanent magnet 3 would partially flow toward neighboring magnetic poles, causing a decrease in the magnetic flux formed at individual magnetic poles by cancellation of the magnet flux of opposite direction. The movable element 8, therefore, preferably has a width equal to or narrower than half the width of the slit 9 for the movable element. On the other hand, if the movable element 8 has a width narrower than half the width of the slit 9 for the movable element in the circumferential direction, the magnetic flux from the permanent magnet 3 would not flow toward the neighboring magnetic poles even partially, but a substantial width needs to be secured because the field magnetic flux cannot be increased if the width is too small. Thus, the necessary width in the circumferential direction needs to be determined in view of the amount of the field magnetic flux desired to be increased relative to the possibility of thickening the magnetic path 4 at the magnetic pole portion.

The rotor 1 has the output shaft 7 in the center of the rotor 1. The output shaft is typically made of a magnetic material such as iron. The material of the output shaft 7, however, is desirably a non-magnetic material such as stainless steel as in the technique disclosed herein to allow the magnetic flux of the permanent magnet 3 to reach outside of the rotor. Alternatively, a hollow output shaft 7 may be used.

Figure 5:
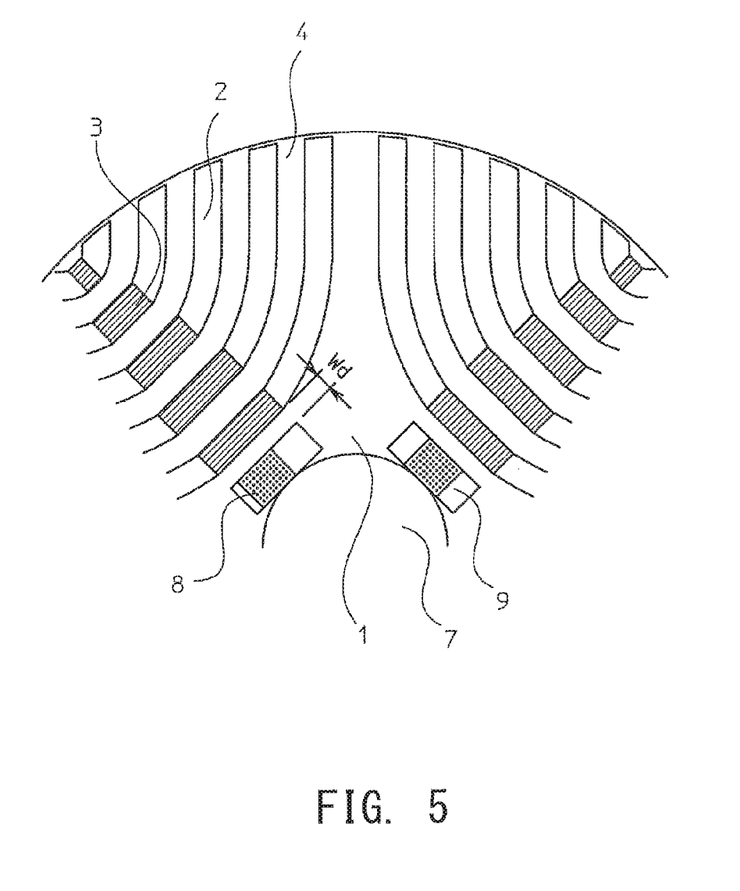
FIG. 5 illustrates an example positions of a movable element and slits for the movable element of the rotor.

In the above description, the inner side of the permanent magnet 3 located innermost is in a circular shape. Alternatively, the inner side may be linear, so that the movable element and the slit for the movable element are configured as illustrated in FIG. 5. Namely, the inner side of the innermost slit 2 into which the permanent magnet is inserted and the inner and outer sides of both the slit 9 and the movable element 8 for the movable element are in a linear shape and in parallel with each other. The inside and outside of the slit 9 may be connected by vertical lines in the drawing, but the connecting line may be in any shape so long as the end of the movable element 8 and the end of the slit in the circumferential direction are identical so that the movable element 8 can fit closely with the side faces.

REFERENCE SIGNS LIST

1 Rotor
2 Slit
2 Innermost slit
3 Permanent magnet
4 Magnetic path
5 Stator
6 Slot
7 Output shaft
8 Movable element
9 Slit for movable element

The invention claimed is:

1. A rotor for a flux-barrier-type reluctance motor having a plurality of poles formed in a circumferential direction, comprising:
a plurality of slits provided for each pole and arranged in parallel with each other in a radial direction to form a magnetic path between the slits;
a permanent magnet partially inserted into the slits in such a manner that magnetic poles of the permanent magnet are directed substantially orthogonal to the slits;
a cavity having a width in a circumferential direction and disposed radially inside the permanent magnet disposed at an innermost position in the radial direction; and
a movable element made of a magnetic material and inserted into the cavity, the movable element capable of moving in the cavity for the movable element in the circumferential direction while being in contact with both sides of the cavity in the radial direction, wherein
a radially inner side of the innermost slit, into which the permanent magnet is inserted, and radially outer and inner sides of both the cavity and the movable element are in a concentric circular-arc shape.

2. The rotor for a flux-barrier-type reluctance motor according to claim 1, wherein
the movable element has a width in the circumferential direction equal to or smaller than half the width of the cavity in the circumferential direction.

3. The rotor for a flux-barrier-type reluctance motor according to claim 1, wherein
an interval between the radially inner side of the innermost slit in the radial direction and the radially outer side of the cavity has such a width that a value obtained by dividing an amount of field magnetic flux that passes the interval by a cross-sectional area of the interval is equal to or larger than a saturation magnetic density.

4. The rotor for a flux-barrier-type reluctance motor according to claim 1, wherein
an end of the movable element in the circumferential direction and an end of the cavity in the circumferential direction are in an identical shape.

5. A rotor for a flux-barrier-type reluctance motor having a plurality of poles formed in a circumferential direction, comprising:
a plurality of slits provided for each pole and arranged in parallel with each other in a radial direction to form a magnetic path between the slits;
a permanent magnet partially inserted into the slits in such a manner that magnetic poles of the permanent magnet are directed substantially orthogonal to the slits;
a cavity having a width in a circumferential direction and disposed radially inside the permanent magnet disposed at an innermost position in the radial direction; and
a movable element made of a magnetic material and inserted into the cavity, the movable element capable of moving in the cavity in the circumferential direction, wherein
a radially inner side of the innermost slit into which the permanent magnet is inserted is in a linear shape, and
the radially inner side of the innermost slit into which the permanent magnet is inserted, and radially outer and inner sides of both the cavity and the movable element in the radial direction are in a linear shape and parallel with each other.

6. The rotor for a flux-barrier-type reluctance motor according to claim 5, wherein
the movable element has a width in the circumferential direction equal to or smaller than half the width of the cavity in the circumferential direction.

7. The rotor for a flux-barrier-type reluctance motor according to claim 5, wherein
an interval between the radially inner side of the innermost slit in the radial direction and the radially outer side of the cavity has such a width that a value obtained by dividing an amount of field magnetic flux that passes the interval by a cross-sectional area of the interval is equal to or larger than a saturation magnetic density.

8. The rotor for a flux-barrier-type reluctance motor according to claim 5, wherein
an end of the movable element in the circumferential direction and an end of the cavity in the circumferential direction are in an identical shape.

* * * * *